United States Patent [19]

Dieterich

[11] Patent Number: 4,549,228
[45] Date of Patent: Oct. 22, 1985

[54] VIDEO DISC ENCODING AND DECODING SYSTEM PROVIDING INTRA-FIELD TRACK ERROR CORRECTION

[75] Inventor: Charles B. Dieterich, Kingston, N.J.

[73] Assignee: RCA Corporation, Princeton, N.J.

[21] Appl. No.: 556,444

[22] Filed: Nov. 30, 1983

[51] Int. Cl.$^4$ .................... H04N 5/781; G11B 21/10
[52] U.S. Cl. .................................. 358/342; 358/907; 369/43; 369/50
[58] Field of Search .............. 358/327, 336, 342, 343, 358/907; 360/8, 9.1, 10.1, 19.1, 27, 32; 369/43, 44, 46, 48, 50, 59, 111

[56] References Cited

U.S. PATENT DOCUMENTS

| | | | |
|---|---|---|---|
| 4,282,551 | 8/1981 | Kanazawa et al. | 360/32 |
| 4,307,418 | 12/1981 | Mindel et al. | |
| 4,308,557 | 12/1981 | Dieterich . | |
| 4,309,721 | 1/1982 | Christopher . | |
| 4,313,134 | 1/1982 | Rustman et al. | |
| 4,375,088 | 2/1983 | de Haan et al. | 369/48 |
| 4,426,698 | 1/1984 | Pargee, Jr. | 360/8 |
| 4,455,635 | 6/1984 | Dieterich | 369/59 |
| 4,488,278 | 12/1984 | Dieterich | 369/50 |

*Primary Examiner*—Donald McElheny, Jr.
*Attorney, Agent, or Firm*—P. J. Rasmussen; P. M. Emanuel; R. G. Coalter

[57] ABSTRACT

A video disc tracking information encoding system includes a primary encoder for tracking information on a field-by-field basis and a secondary encoder for conveying a subset of the tracking information every N lines within a field. A video disc player for discs recorded with doubly conveyed complete and partial tracking information includes means for recovering the partial tracking information every N lines, comparing it with the complete tracking information recovered during the start of each field and effecting tracking error correction if the partial tracking information differs from a predetermined subset of the complete tracking information thereby facilitating intra-field track error correction so as to enable rapid correction of tracking errors.

15 Claims, 10 Drawing Figures

| | I BITS | Q BITS | |
|---|---|---|---|
| LINE N | 1 | 0 | |
| LINE N+1 | D1 | D2 | |
| LINE N+2 | D3 | D4 | DATA WORD N |
| LINE N+4 | D5 | PARITY | |
| LINE N+5 | 1 | 1 | |
| LINE N+6 | D1 | D2 | |
| LINE N+7 | D3 | D4 | DATA WORD N+1 |
| LINE N+8 | D5 | PARITY | |
| LINE N+9 | 1 | 0 | |
| | D1 | D2 | DATA WORD N+2 |
*Fig. 6*
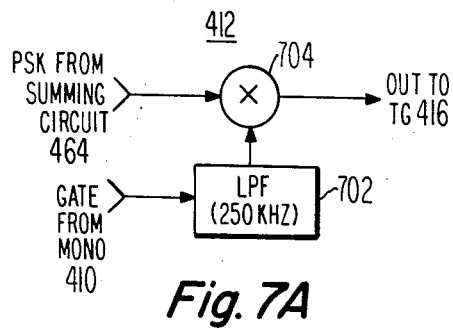
*Fig. 7A*
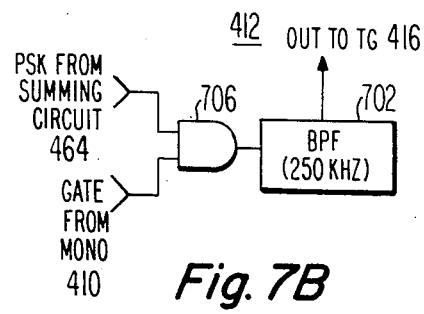
*Fig. 7B*

4,549,228

VIDEO DISC ENCODING AND DECODING SYSTEM PROVIDING INTRA-FIELD TRACK ERROR CORRECTION

FIELD OF THE INVENTION

This invention relates to video disc systems and particularly to systems wherein field identification numbers are recorded in the vertical blanking interval and recovered upon playback of the disc to facilitate track error correction.

BACKGROUND OF THE INVENTION

Video disc players have inherent advantages in playing back video programs as compared with video tape players, e.g., the ability to quickly access the recorded information, relatively low replication costs, relatively simple mechanical requirements, etc. This, unfortunately, is accompanied by a basic disadvantage relating to tracking errors. Specifically, a forward or backward skip of one track on a helical scan VTR results in only a one field error in the location of the pick-up transducer. A single skip of one track convolution in a presently available video disc player (e.g., the RCA model SFT-100) results in an eight field error in the recovered signal. In another known player a skip of one track results in a two field error for disks recorded at a constant angular velocity.

It is known that one may correct tracking errors in a video disc player on a field-by-field basis thereby placing video disc players on a par with video tape players. As an example, in U.S. Pat. No. 4,313,134 of Rustman et al., a video disc system is disclosed wherein field numbers are recorded in pulse code modulation (PCM) form during the vertical interval of each video field. This has become known as a digital auxiliary information code (hereinafter DAXI code). Tracking errors (e.g., locked or skipped grooves or information tracks) are detected in a player by noting an improper sequence of two or more decoded DAXI field numbers. Correction of the error is provided by means of a transducer deflector (e.g., a stylus "kicker" solenoid or piezoelectric element) which radially translates the pick-up transducer in a direction to reduce the tracking error until such time as the field numbers again form an orderly sequence. Other patents relating to the DAXI code, its generation, recovery and use in video disc player include U.S. Pat. No. 4,308,557 of C. B. Dieterich, U.S. Pat. No. 4,307,418 of Mindel et al. and U.S. Pat. No. 4,309,721 of Christopher.

SUMMARY OF THE INVENTION

It is herein recognized that a need exists for correction of tracking errors in video disc systems on a more frequent basis than the field-by-field (inter-field) basis provided in known video disc systems.

It is a specific object of the present invention to provide video disc encoding and decoding systems capable of providing track error correction on a line basis so as to facilitate intra-field track error correction.

A method embodying the invention for forming a video disc recording signal, for facilitating intra-field track error correction, comprises providing a video signal and a data sequence representative of field numbers. The video signal, the data sequence and a subset of the data sequence are processed to form a recording signal with the subset data sequence conveying partial tracking information on a line-by-line or plural line basis within each field.

A player for a disc encoded as described includes means for comparing an anticipated track number (from the recovered subsets) with the actual track number (from the corresponding portion of the full field number) to develop an error signal for radially translating the player pickup transducer in a sense to correct tracking errors when the numbers differ.

BRIEF DESCRIPTION OF THE DRAWING

FIG. 6 is a bit map diagram illustrating data sequencing in the system of FIG. 3;

FIGS. 7A and 7B are block diagrams of signal shaping gates suitable for use in the IFTEC encoder of FIG. 4;

DETAILED DESCRIPTION

Figure 1:
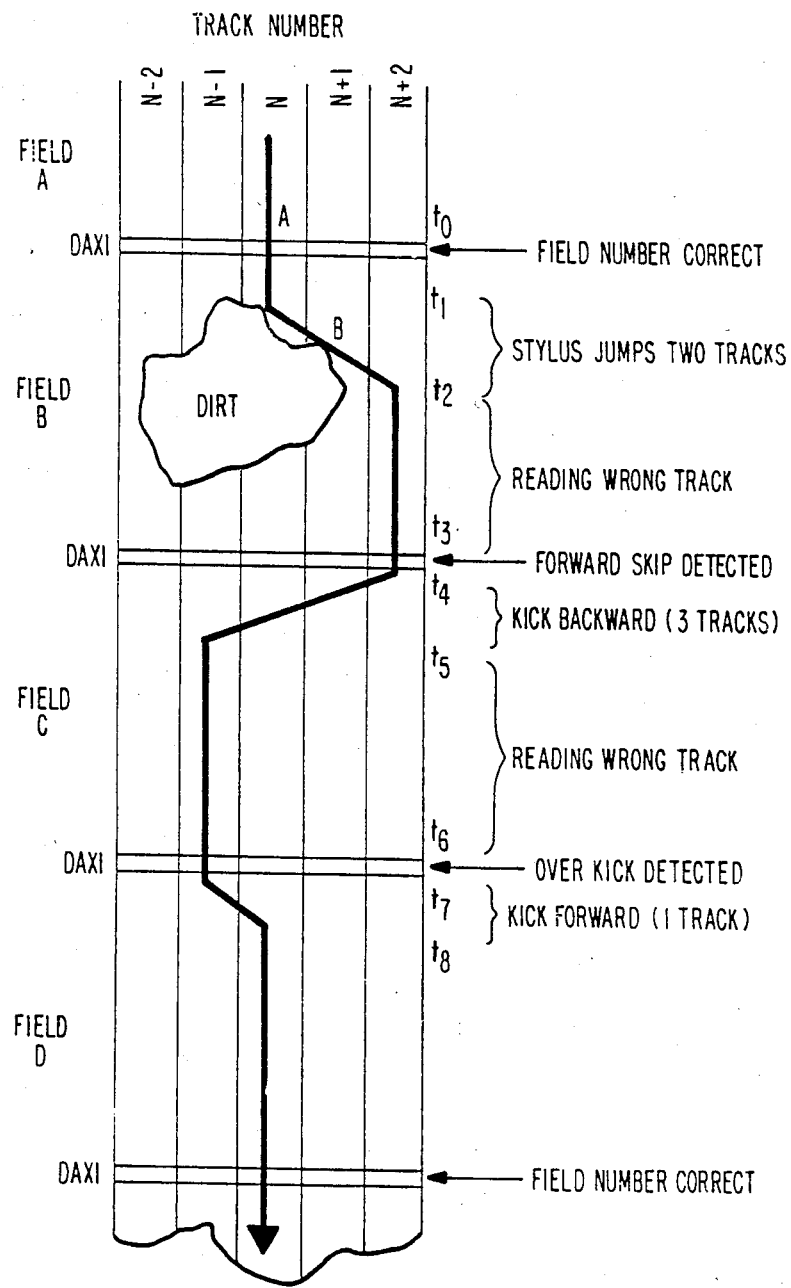
FIGS. 1 and 2 are plan views of a portion of a video disc record showing the locus of travel of a pick-up stylus in a disc player having field-by-field (inter-field) track error correction (FIG. 1) and line related track error correction in accordance with the invention (FIG. 2)
Figure 2:
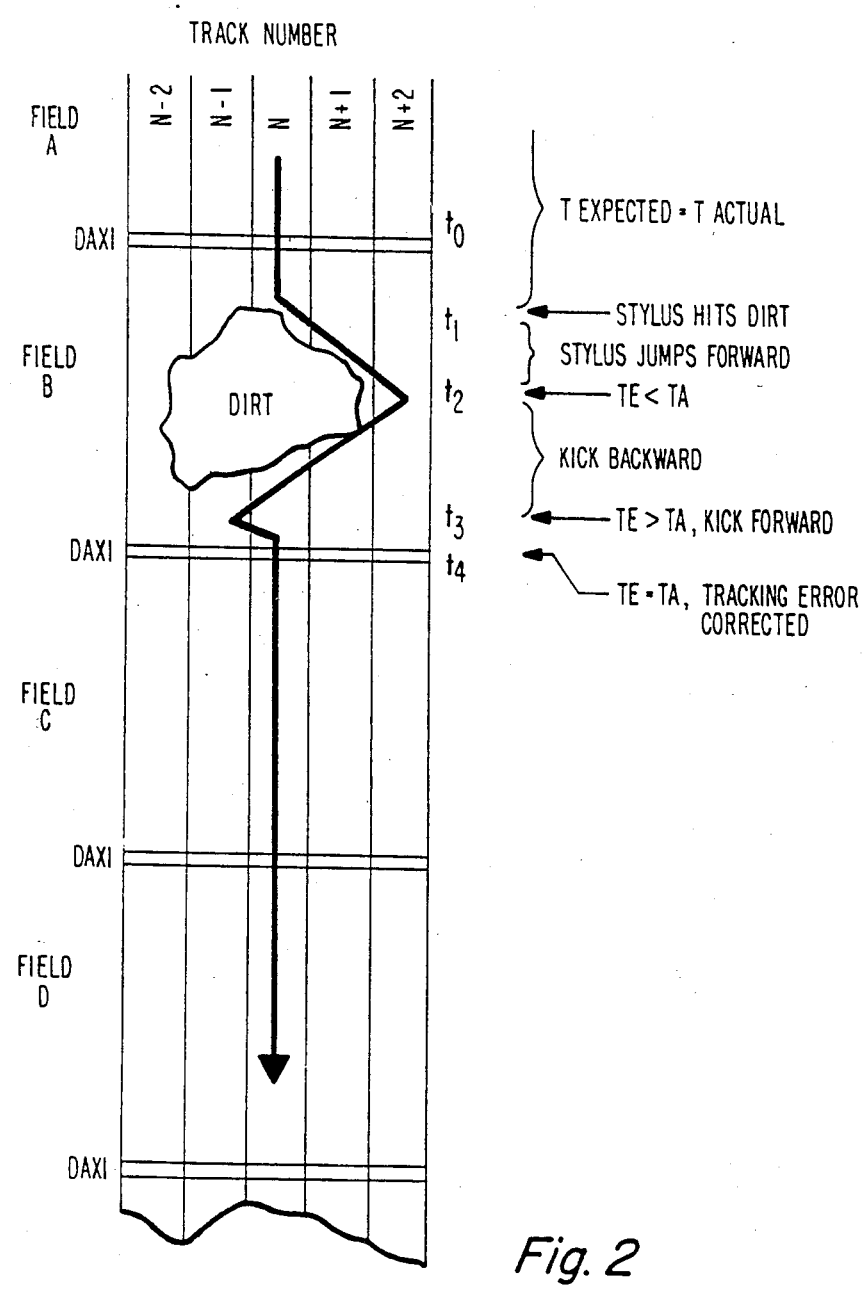

FIGS. 1 and 2 provide a comparison of a field-by-field track error correction method (FIG. 1) with the line-by-line correction method of the present invention (FIG. 2). In FIG. 1, five adjacent tracks of a disc record are shown along with the locus (path) of travel (dark arrow) of a signal recovery stylus. The term "track", as used herein, means an information conveying path on a disc and may be formed in a spiral or in concentric circles. The stylus is initially in track number N of field A at time $t_0$ and is lofted from the disc at time $t_1$ upon encountering a particle of dirt spanning tracks $N-2$, $N-1$ and N. At time $t_2$ the stylus lands in track number $N+2$ and continues in that track until the beginning of the next field (field C). Since the stylus has been radially translated by two tracks, the true tracking error amounts to a total skip of sixteen fields in a disc system where there are eight fields per disc convolution.

To correct the tracking error, the DAXI field number code recovered in the vertical interval of field B is compared with the code for field C which is recovered at time $t_3$. A kick pulse is applied to the stylus at time $t_4$ which, for illustrative purposes, results in an overkick in the interval $t_4$ to $t_5$ to track number $N-1$. The overkick is corrected in a similar fashion in field D until the stylus is again tracking the correct track N.

As seen, in this hypothetical example, the total time lost during track error correction amounts to about two fields. Even if the overkick had not occurred in field C, the disruption in the video signal would amount to about one field which would be visible in the displayed video. image and audible in the reproduced sound. It is desirable to reduce the duration of the disruptions and thus increase the "fidelity" of the recovered image.

FIG. 2 illustrates the improvement which may be obtained when track error correction is provided on a line-by-line basis in accordance with the invention using information specially encoded in horizontal data lines. As shown, the two corrections for traversing the dirt particle are accomplished well within the time frame of one field. For purposes of illustration, the size of the dirt particle is greatly exaggerated. In practice most disc defects are quite small relative to the physical dimension (length) of one field and so corrections may be made within a few lines. It should be noted from FIG. 1, however, that even a small defect in a disc with field-by-field track error correction can nevertheless result in a track error approaching one entire field or more in length.

Figure 3:
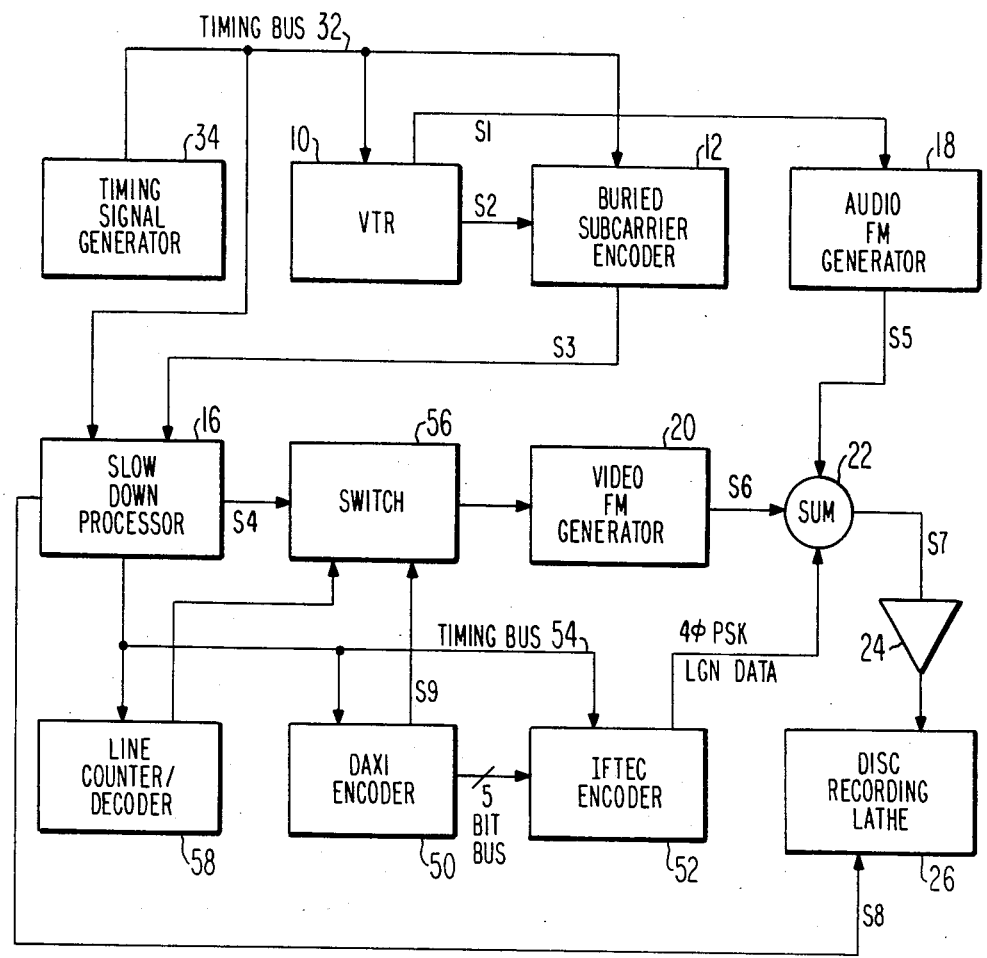
FIG. 3 is a block diagram of a video disc recording system embodying the invention.

The video disc mastering system of FIG. 3 includes a video tape recorder 10 for providing a source of audio signal S1 and video signal S2 to be recorded. Recorder 10 is preferably a slow motion recorder provided with automatic scan tracking (AST) to facilitate mastering at half rate (one half normal playback speed) using the skip field mastering technique described in detail in U.S. Pat. No. 4,277,796 of M. Ross entitled "SLOW DOWN COLOR PROCESSOR FOR VIDEO DISC MASTERING USING A SPECIAL MODE VTR". The video signal S2 is applied to a buried subcarrier (BSC) encoder 12 which, preferably, is of the type described in U.S. Pat. No. 3,872,498 of Pritchard. In the BSC format used in FIG. 3, chrominance information is represented by a color subcarrier of the general form employed in the well known NTSC format which is buried in a lower portion of the video band rather than being located in the high end of the luminance signal band. An illustrative subcarrier frequency choice is in the vicinity of 1.53 MHz with the color subcarrier sidebands extending plus or minus 500 KHz thereabout and with the luminance signal band extending well above the highest color subcarrier frequency (to 3 MHz, for example).

The BSC encoded video signal S3 is applied to a video slow down processor 16 which preferably is of the type described in the Ross patent. Briefly, in the Ross system selected fields of the redundant field (slow motion) video signal S3 are stored in a memory in processor 16 at a standard clock rate and recovered at a lower clock rate that is inversely proportional to the number of times each field is repeated so as to produce a non-redundant video output signal (S4 here) of reduced bandwidth. The bandwidth of the audio signal S1 is reduced by the same factor as the video signal (one half) during operation of recorder 10 in the slow motion mode. The audio signal S1 and the processed video signal S4 are applied to respective frequency modulators 18 and 20 and the resultant frequency modulated signals S5 and S6, respectively, are combined in a summing circuit 22 to form a resultant composite recording signal S7 processing the full informational content of the original audio and video signals. The recording signal S7 is applied via an amplifier/equalizer 24 to the cutterhead of a recording lathe 26. The turntable of lathe 26 is rotated by a drive motor (not shown) which receives half-rate drive signals S8 produced by processor 16 whereby full bandwidth master recordings may be made with a cutterhead of lesser bandwidth.

Synchronization of recorder 10, encoder 12, and processor 16 is provided by means of a timing bus 32 supplied with timing signals (e.g., vertical, horizontal, color subcarrier, etc.) produced by a timing signal generator 34. A generator suitable for producing NTSC format standard video timing signals is the Tektronics Model 146 NTSC Test Signal Generator. (For mastering in other formats such as PAL or SECAM an appropriate generator should be used).

The remaining elements of the mastering system encode digital data for recording along with the video signal on lathe 26. Two data encoders are provided, namely, a DAXI data encoder 50 and an intra-field track error correction encoder (IFTEC) 52. The encoders receive "half rate" timing signals from a bus 54 from slow down processor 16. The "half rate" timing signals include horizontal blanking pulses (HB/2), vertical field pulses (FV/2), horizontal sync pulses (HS/2) and the buried subcarrier reference frequency (FBSC/2). DAXI data encoder 50, illustratively, is of the type described in the aforementioned patent of Dieterich and the other patents relating to DAXI coding and provides video field and band numbers and other suitable information relating to the video signal produced by recorder 10 (e.g., bits may be assigned to identify monophonic or stereophonic or bilingual material, etc.). As an illustration, field identification numbers may be produced by encoder 50 by counting vertical field pulses provided via bus 54 from processor 16.

The DAXI data signal S9 is inserted in place of the video signal 54 on lines 17 and 280 of each frame by means of a multiplex switch 56 interposed between processor 16 and video FM generator (modulator) 20. Switch 56 is controlled by a line counter/decoder 58 coupled to bus 54. Normally, switch 56 couples the video signal S4 to generator 20 but changes over to couple the DAXI signal S9 when the line counter count is 17 or 280. The DAXI signal comprises a 77 bit PCM word synchronized with the buried color subcarrier frequency (about 1.53 MHz at full rate, 1.53 MHz/2 for half rate mastering) to facilitate subsequent detection in a video disc player. Each DAXI word comprises a 13 bit start code (a Barker sequence for data framing) followed by a 13 bit CRC (cyclic redundancy check) error check code and ending with a 51 bit information code. Of the 51 bits in the information code, 6 provide a record band number, 18 provide a video field identification number (each field on a disc side is uniquely identified) and the remaining 27 are currently unassigned but are included to provide information capacity for future expansion or other uses of the DAXI code.

The IFTEC encoder 52 receives timing signals (at half rate for half rate mastering) from bus 54 and 5 bits (parallel) of the 18 bit field identification number from DAXI encoder 52 and supplies a 4 phase, phase shift keyed (PSK) signal representing local "groove" (or track) numbers (LGN data) to a further input of summing circuit 22. The PSK carrier frequency is equal to FBSC which, in this case, is 1.53 MHz/2 since the recording is done at half rate (225 RPM). When the disc is played back at normal speed (450 RPM) in a player, all of the various carriers (audio, video, QPSK) are recovered at their normal frequencies.

The 5 bits selected from the 18 bit field identification number are a particular subset providing identification of 32 least significant "track" or "groove" numbers. A complete track number comprises all bits of the 18 bit field number except the 3 least significant bits (LSBs). The LSBs, in the "capacitance electronic disc" (CED) system uniquely identify the 8 field sectors of the disc. Since it is track convolutions and not sector identification which is of importance to the present invention, the 5 bit subset of the 18 bit field number corresponds to bits 4, 5, 6, 7 and 8 (where the LSB is bit 1 and the MSB is bit 8). This provides identification within a field of stylus skips forward or backward of 16 grooves. Most tracking errors are much less than skips of 16 grooves, a one groove skip being most common.

To correct for intra-field tracking errors in a video disc player, the LGN data is recovered, as will be described, and compared with the corresponding 5 bits conveyed by the DAXI code. If the LGN and DAXI groove (track) numbers are the same, then no error has occurred and no corrective action is needed. Conversely, if the LGN and DAXI numbers differ, then an interrupt signal is sent to the player tracking control microprocessor along with the "difference" number and the player microprocessor supplies "kick" pulses to the pick-up transducer in a sense to reduce the tracking error until the DAXI and LGN numbes agree and the interrupt signal is terminated.

Figure 4:
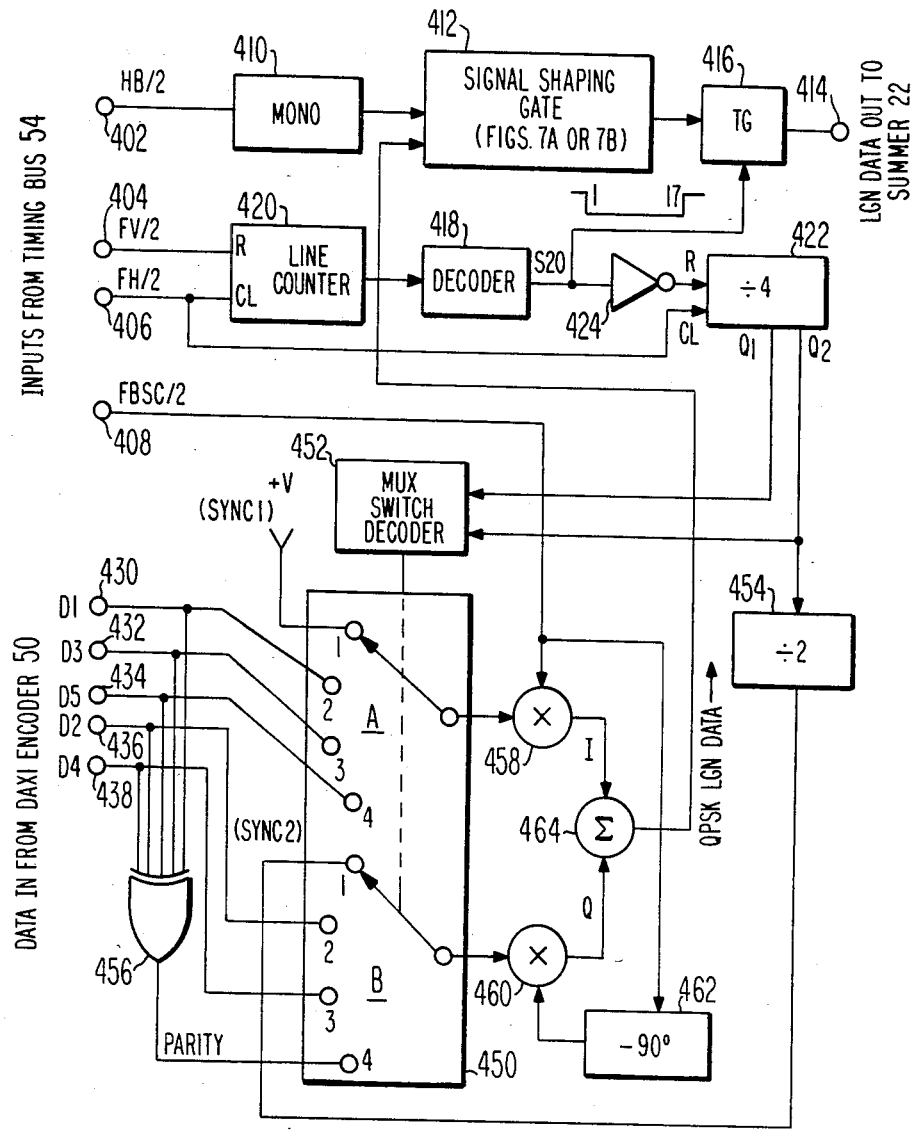
FIG. 4 is a detailed block diagram of an intra-field track error correction (IFTEC) encoder suitable for use in the system of FIG. 3.

FIG. 4 is a detailed embodiment of a preferred implementation of IFTEC encoder 52. Briefly, the encoder adds two start bits (one constant, one alternating on a 4 line basis) and a parity bit to the 5 LGN data bits to create an 8 bit word which is then QPSK (quadrature phase shift keyed) encoded on the FBSC carrier (1.53 MHz/2, half rate recording) for transmission at a rate of 2 bits per line during a portion of the horizontal blanking (HB) interval. The encoded LGN data (8 bits) thus requires 4 lines for transmission (at 2 bits/line) and repeats throughout a field thereby making intra-field track error correction possible every four lines.

Encoder 52 comprises input terminals 402, 404, 406 and 408 for receiving, respectively, horizontal blanking pulses (HB/2), vertical field pulses (FV/2), horizontal sync pulses (HS/2) and the buried subcarrier reference frequency (FBSC/2) from slow down processor 16 via timing bus 54. All these signals are at half their normal rate for "half rate" mastering but may be full rate signals when making recordings at "real time" (e.g., 450 RPM for the NTSC CED system). Signal HB is applied to a monostable multivibrator 410 which produces an output pulse (FIG. 5C) upon the occurrence of each blanking pulse (FIG. 5B). The monostable time constant is selected to be sufficiently shorter than HS so that the mono pulse includes substantially all of the sync tip of the video signal (S4, FIG. 5A, FIG. 3) but does not include any of the burst component of video signal S4. A suitable time constant for half rate recording is 9.5 microseconds (FIG. 5C) or 4.75 microseconds for "real time" recording.

The purpose of mono 410 is to control a signal shaping gate 412 which produces a QPSK burst shaped as shown in FIG. 5D conveying information 2 bits at a time in accordance with the phasor diagram of FIG. 5E. Then 4 QPSK bursts convey 8 bits of information in 4 video lines (2 start bits, 5 data bits, 1 parity bit as shown in FIG. 6). The QPSK signal is generated, as will be explained, gated by gate 412 and applied to summing circuit 22 via output terminal 414 during all horizontal lines except the first 17 lines of the vertical interval. These lines are excluded because nine of these convey vertical blanking information and the seventeenth line conveys the DAXI code with the complete field number. Since the LGN number changes with each revolution of the disc based on bits B4-B8 of the DAXI code, the LGN data for any field begins after the DAXI data for that field.

Exclusion of LGN data from lines 1-17 is provided by a transmission gate 416 which is interposed in the LGN QPSK signal path (here, at the output of gate 412) and supplied with a disabling signal during the first 17 lines of each field. The disabling signal (S20) is produced by a decoder 418 coupled to a line counter 420 which, in turn, is clocked by fH/2 and reset by fV/2. Additionally, signal S20 is also used for the purpose of synchronizing (resetting) a divide-by-four counter 422 which is clocked at line rate (fH/2). This is accomplished by means of an inverter 424 which inverts signal S20 and applies the inverted signal to the reset input of counter 422. As a result counter 422 is held in a reset condition throughout lines 1-17 and enabled at the start of line 18.

The function of counter 422 is to generate a two bit code (Q1 and Q2 outputs) which uniquely identifies each line of each 4 line sequence that comprises a data "word". FIG. 6 illustrates the 4 line structure of data words N, N+1 and a portion of word N+2. Note that the first start bit of all words is always a "1" but that the second start bit alternates between logic "1" and logic "0" every four lines from word to word. This alternating start bit is used in detecting sync errors as will be explained in connection with the video disc player of FIG. 8.

The remaining elements of FIG. 4 format the partial groove number data from DAXI encoder 50 in accordance with the QPSK format of FIGS. 5A–5E and the particular sequence of FIG. 6. For convenience, the data bits to be recorded are designated as D1–D5. These bits correspond to bits D4–D8 of the 18 bit DAXI field number and are applied to input terminals 430-438. Data, sync, and parity selection for QPSK encoding is provided by a two-pole, four-throw multiplex switch 450 having two four-position sections (A and B) and controlled by a decoder 452 which steps the switch through the four positions 1, 2, 3 and 4 as signals Q1 and Q2 of divider 422 cycle through their binary sequence 00, 01, 10 and 11. When in position "1", section A selects a fixed voltage level signal (+V) which corresponds to the first sync bit of a data word and section B selects the output of a divider 454 which divides the frequency of the output signal of divider 422 by two. This signal is the alternating second sync bit which changes state after each four line LGN code word (see FIG. 6). The remaining switch positions selects the five data bits in pairs. The fifth data bit is selected by section A at position 4 and "paired" with a parity bit by section B that selects the output of an exclusive-OR gate 456 which is coupled to receive the five data bits D1–D5.

Figure 5:
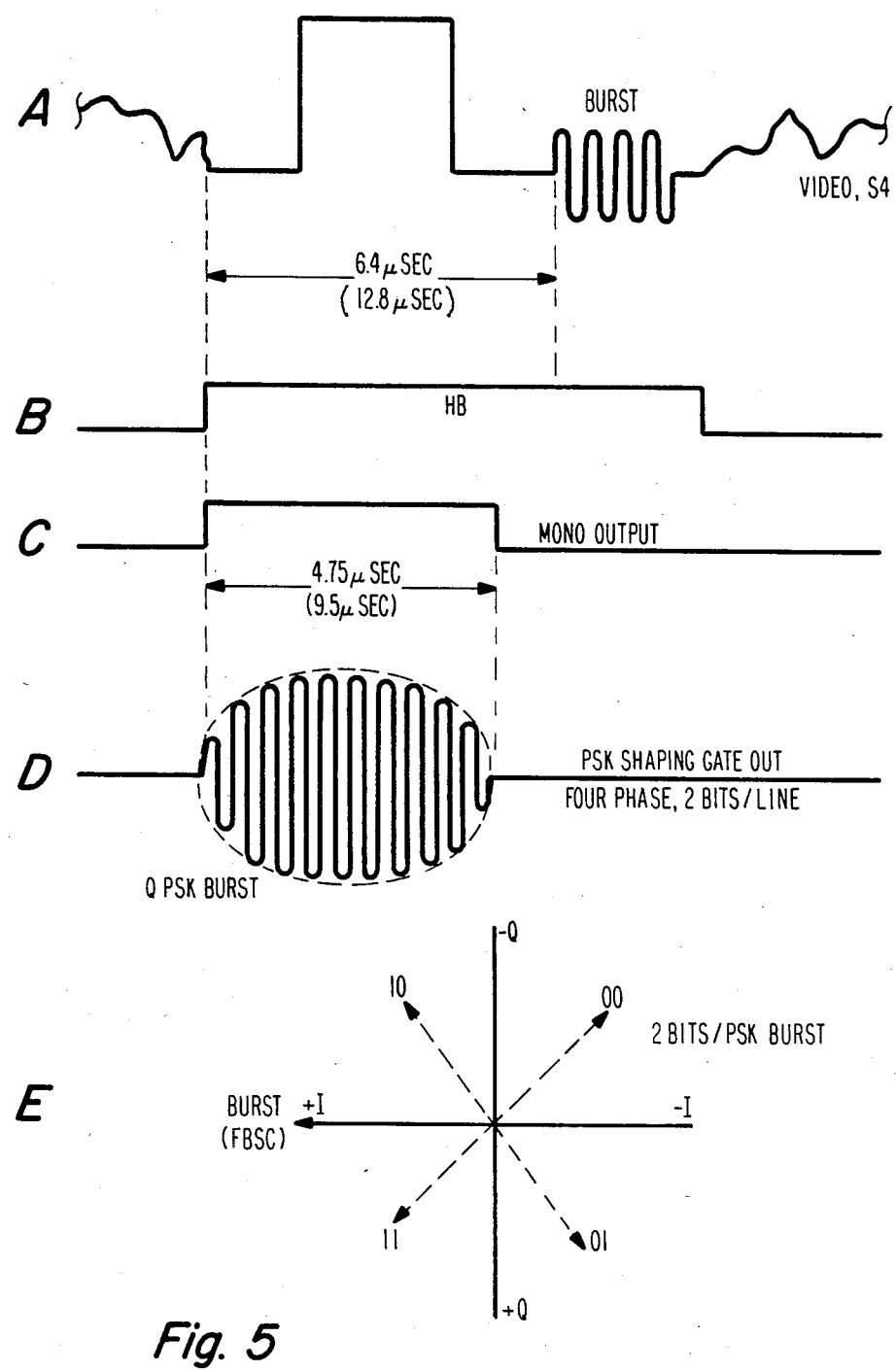
FIG. 5 is a waveform and phasor diagram illustrating operation of the system of FIG. 3.

The sync and data selected by switch section A will be referred to as the I data because it is applied to a multiplier 458 and multiplied in-phase with FBSC/2. The alternating sync, data and parity bits selected by section B will be referred to as the Q (quadrature phase) data as it is multiplied in a multiplier 460 with FBSC delayed by 90 degrees in delay line 462. The I and the Q data produced by multipliers 458 and 460 is combined in an adder 464 to produce the QPSK LGN (quadrature phase shift keyed, local groove number) encoded information wherein 2 bits of data are represented by each of the four possible phases of the FSBC carrier as shown in FIG. 5. This data is then applied to signal shaping gate 412 which bandwidth limits the signal bandwidth to about 0.5 MHz (0.25 MHz for half-rate recording) and under the control of monostable 410 inserts the local groove or track number bursts in the horizontal blanking interval just before the color burst as illustrated in FIGS. 5A and 5D.

FIGS. 7A and 7B illustrate two alternative embodiments of the signal shaping gate 412 of the IFTEC ENCODER 52 of FIG. 4. In the example of FIG. 7A, the gating signal from monostable 410 is filtered by a low pass filter 702 and the filtered signal is then multiplied with the QPSK encoded data from summing circuit 464 to provide a smoothed QPSK burst to transmission gate 416. In half rate mastering, the filter cutoff frequency is one half that ultimately desired, so in this case the frequency is 250 KHz. The example of FIG. 7B differs in that the signals to be shaped are first applied to an AND gate 706 and the resultant gated signal is then filtered by a bandpass filter 702. The center frequency of the filter is FBSC/2 for half rate mastering and the bandwidth is 250 KHz. It is a desirable feature of the invention that the encoded LGN or "IFTEC" data be suitably filtered before being added to the audio and video FM signals in the mastering system (FIG. 1) so as to avoid any potential interference with either the video sync signals or the audio signal or signals (stereo systems would have an additional audio FM carrier wave added to summing circuit 22).

Figure 8:
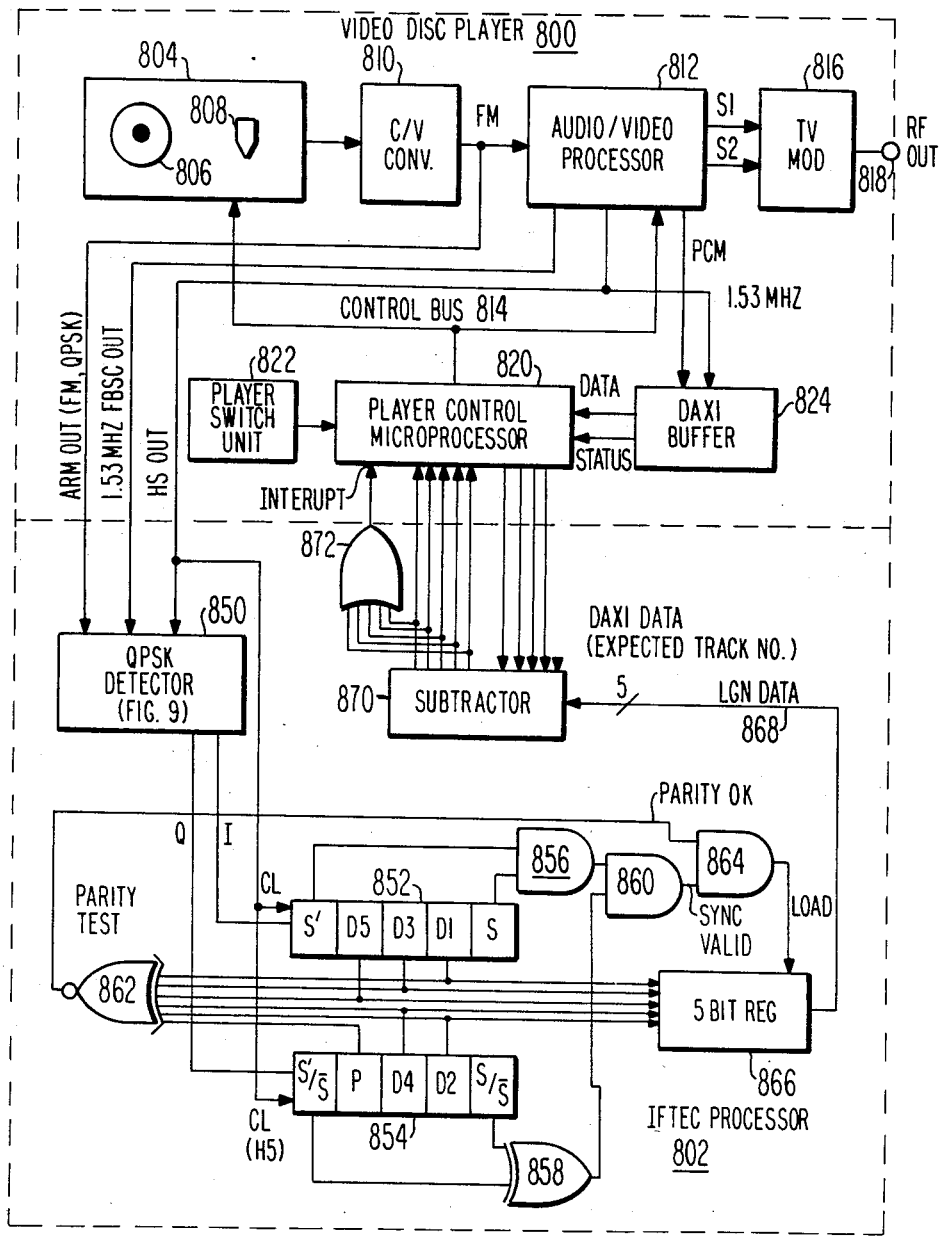
FIG. 8 is a block diagram of a videodisc player embodying the invention.

FIG. 8 is exemplary of a video disc player 800 (outlined in phantom) modified by the addition of an intrafield track error correction (IFTEC) processor 802 (also outlined in phantom) to provide the line-by-line track error correction feature of the invention when playing back video disc records mastered as previously described. The player 800 may be of conventional design such as the model SJT-400 CED video disc player manufactured by RCA Corporation. The principles of the invention, of course, may readily be applied to any form of video disc player wherein field or tracking information is conveyed during the vertical interval of a field by a coding system such as the DAXI system or some other suitable system. Of importance to an aspect of the present invention is that there be some form of "primary" coding system for conveying tracking information on a field-by-field basis or at least a frame-by-frame basis and a "secondary" coding system for conveying a subset of the primary tracking information on a line basis. In the present system, the intra-field tracking information is conveyed on a four line basis, that is, the tracking information is available every four lines throughout each field. By going to a more sophisticated code, (e.g., an eight phase or a sixteen phase system) the tracking information may be conveyed even more frequently (e.g., on two lines or even on a line-by-line basis). As a practical matter, however, it has been found that a striking improvement in "playability" of discs with severe defects may be obtained by correcting the errors on a four-line basis.

Player 800 includes a turntable mechanism 804 for rotating a video disc record 806 and a pickup transducer 808 for recovering information signal from the disc. In the CED system, the information is stored in the form of topological variations of a spiral information track and recovered by sensing capacitance variations between a stylus in transducer 808 and the record 806. The output of transducer 808 is applied to a capacitance-to-voltage (C/V) converter 810 which produces an FM output signal representative of the recorded information. Such records and suitable circuits for implementing the C/V conversion are well known. See for example, U.S. Pat. Nos. 3,783,196 (Stanley), 3,842,194 (Clemens) and 4,080,625 (Kawamoto et al.).

The FM signal is applied to an audio/video processor 812 which produces a baseband audio output signal S1 and a baseband composite video output signal S2. Processor 812 has an input connected to a player control bus 814 for receiving squelch signals for muting the audio and video signals under certain player operating conditions (e.g., "pause"). Bus 814 also conveys turntable motor and tracking control signals to mechanism 804. Pyles et al., in U.S. Pat. No. 4,286,290 entitled "FAST RECOVERY SQUELCH CIRCUIT FOR A VIDEO DISC PLAYER" which issued Aug. 25, 1981, discloses a suitable implementation of processor 812 which provides timebase error correction circuitry and format conversion circuitry for converting the recovered video signal from the buried "subcarrier" format proposed by Pritchard in U.S. Pat. No. 3,872,498 to the NTSC format. Carnt et al., in U.S. Pat. No. 4,200,881 describe processors suitable for recording and reproducing composite video signals of PAL format.

The baseband audio and video signals S1 and S2 produced by processor 812 are applied to the sound and picture carrier modulation inputs of a TV modulator 816 which has an RF output terminal 818 for connection to the antenna input termnal of a conventional television receiver for displaying sound and picture information recovered from disc 806. An integrated circuit suitable for use as modulator 816 is the type LM 1889 available, for example, from National Semiconductor, Inc.

A player control microprocessor 820 provides various supervisory and information display control functions. The control functions (supplied via bus 814) include, illustratively, "stylus kicking" and control of the radial position, elevation, velocity and direction of movement of pick-up transducer 808 relative to disc 806 and squelching of the audio and video signals produced by processor 812. Some of the functions are initiated manually by means of a player control switch unit 822 coupled to an input port of microprocessor 820. Manually initiated functions include, illustratively, play, pause, slow scan forward or reverse, etc. Upon closure of one of the user activated switches in unit 822, microprocessor 820 addresses its internal read only memory (ROM) and fetches an appropriate sequence of instructions resident in the memory for effecting the desired control function.

DAXI information (e.g., field numbers, band numbers, etc.) is conveyed to microprocessor 820 by means of a DAXI BUFFER integrated circuit 824 having inputs coupled to receive PCM data and a 1.53 MHz clock signals (FBSC) from processor 812 and having outputs coupled to supply data and a data status flag signal to input ports of microprocessor 820. When a DAXI code word is received without error, the status flag is SET and microprocessor 820 processes the data for machine control purposes (e.g., detecting stop flags or end of record bits) anc player display purposes (e.g., calculation of elapsed playing time from the 18 bit field number data). Buffer 824 and microprocessor 820 are commercially available integrated circuits and are described in more detail in the previously mentioned DAXI related U.S. patents.

Buffer 824 is interfaced with a comb filter (not shown) in processor 812 for detecting the PCM DAXI data as described in C. B. Dieterich's U.S. Pat. No. 4,275,416 entitled "PCM DETECTOR" which issued June 23, 1981. For the purposes of the present invention, only four types of signals are needed from video disc player 800 for use in the IFTEC processor 802. They are: the player "arm output" (AO) signal provided by capacitance-to-voltage converter 810; a 1.53 MHz buried subcarrier reference frequency (FBSC) signal provided by a phase lock loop (PLL) (not shown) within processor 812; a horizontal sync (HS) output signal provided by a sync detector (not shown) in processor 812 and 5 bits of the DAXI field number data provided by the player control microprocessor (alternatively, the field number data may be taken directly from the DAXI buffer 824).

The signals AO, FBSC and HS are applied to a quadrature phase shift key (QPSK) detector 850 in processor 802 which recovers the I and Q data from the arm output signal. A suitable implementation of detector 850 is discussed in connection with FIG. 9. After detection, the I and Q data are shifted into respective 5-bit shift registers 852 and 854 clocked by signal HS. After five lines of recovered I and Q information, registers 852 and 854 contain one complete 8-bit word (see FIG. 6) and the two start bits of the next word. To test the validity of the sync bits the first and fifth bits of register 852 are ANDed in gate 856. Since the first start bit is always "one", gate 856 is enabled if and only if the first start bit of the full word and the next following word are both high. The second start bits are similarly tested but with an exclusive-OR gate 858 since, as previously explained, the second start bit alternates on a four line basis so that the first and fifth bits of register 854 should always differ if no sync error has occurred. The final sync check is performed by ANDing the outputs of gates 856 and 858 in another AND gate 860 which is therefor enabled only if all of the sync bit conditions are met.

Parity is tested by means of a six input exclusive-NOR gate 862 which is enabled if and only if the parity bit P (second stage of register 854) agrees with parity of the data bits D1–D5. A further AND gate 864 combines the results of sync bit test gate 860 and the parity test gate 862 and supplies a "load" command (high signal) to a five bit register 866 if the parity and sync bit tests are satisfied. Register 866 is then loaded with the data bits D1–D5 and supplies the "recovered" local groove or "track" number data in parallel via a five line bus 868 to one input of a subtractor 870 which is coupled to an output of microprocessor 820 (or alternatively, to buffer 824 as previously explained) for receiving bits B4–B8 of the video field number conveyed by the DAXI code. If no tracking error has occurred, the LGN data recovered from the IFTEC processor 802 should be exactly the same as the corresponding data recovered by the DAXI system in the player. If so, the result of the subtraction of the LGN data bits from the DAXI data bits will be zero indicating that no tracking error has occurred.

Zero is tested by means of an OR gate 872 coupled to the output of subtractor 870. If a tracking error has occurred, however, one or more of the subtractor outputs will be non-zero and gate 872 will be enabled to supply an interrupt signal to an interrupt input of microprocessor 820. Simultaneously, the data at the subtractor output (which represents the magnitude and sense of the tracking error) is applied to data input ports of the microprocessor. In response to the tracking error interrupt signal, microprocessor 820 enters an interrupt service routine and begins sending "kick" pulses to transducer 808 via control bus 814 to radially translate the signal recovery stylus of the transducer in a sense and by the indicated number of track convolutions to reduce the tracking error. The interrupt service routine in microprocessor 820 may comprise, illustratively, a jump instruction to the existing track error correction routine already resident in the microprocessor for servicing DAXI detected tracking errors.

Figure 9:
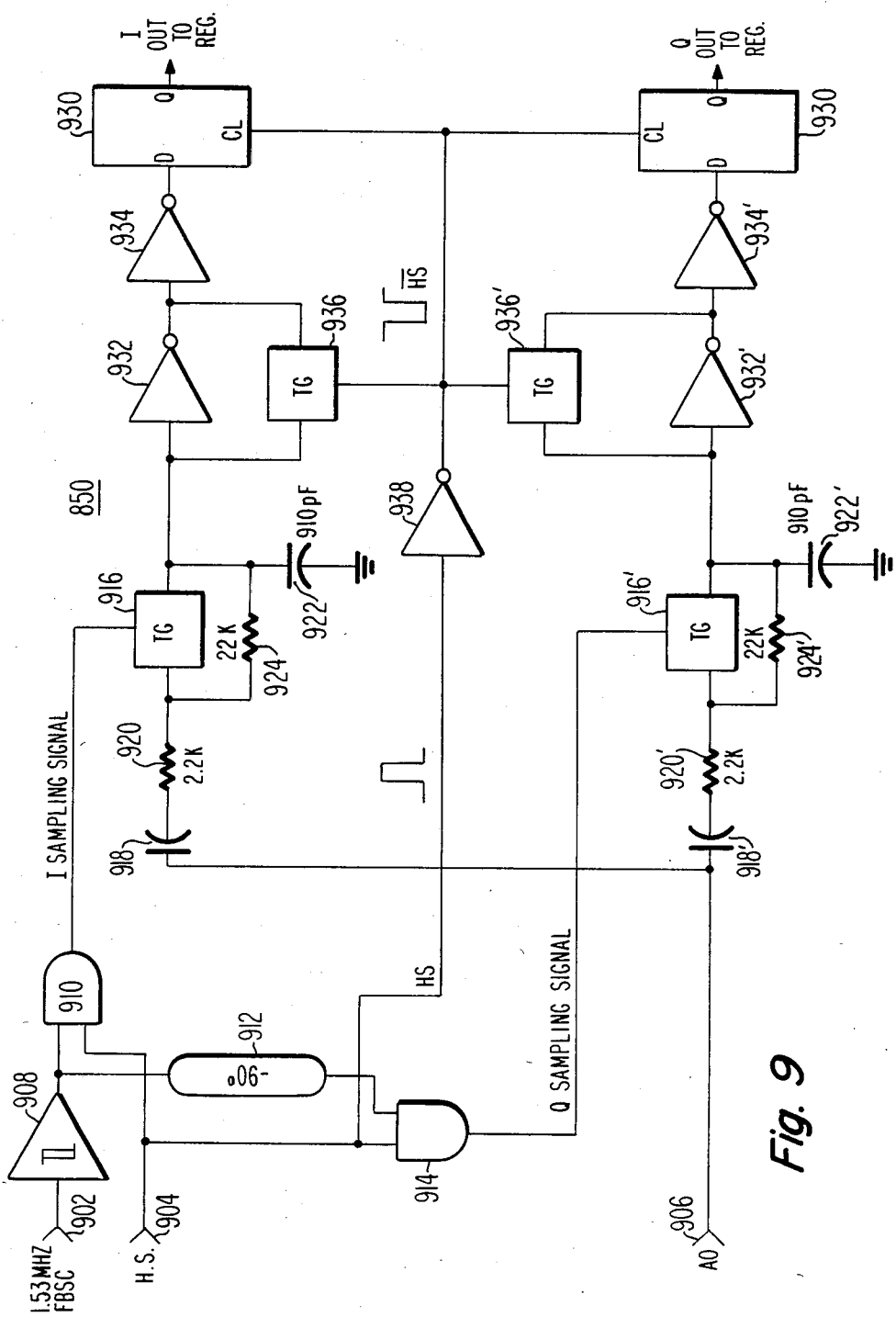
FIG. 9 is a block and circuit diagram of a preferred QPSK detector suitable for use in the player of FIG. 8.

The QPSK detector 850 of FIG. 8 may be implemented as shown in detail in FIG. 9. The detector includes inputs 902, 904 and 906 for receiving, respectively, the 1.53 MHz FBSC, HS and AO signals from player 800. The FBSC signal is "squared up", so to speak, in a hysteresis circuit (Schmitt trigger) 908 and applied along with HS to an AND gate 910 which produces an "I" (in-phase) sampling signal for recovering the I data from the arm output (AO) signal. The output of the hysteresis circuit is delayed by one quarter cycle of FBSC (90 degrees) by means of a delay circuit 912 and applied along with HS to another AND gate 914 for producing a "Q" (quadrature) sampling signal for recovering the Q data from signal AO.

The I sampling signal is applied to the control input of a transmission gate 916 having its input coupled to receive signal AO via a series connection of a D.C. blocking capacitor 918 and a resistor 920. The output of gate 916 is coupled to ground via an integrator capacitor 922 and to its input by a feedback resistor 924. Illustrative values for the input resistor, feedback resistor and integrating capacitor, as shown, are 2.2 K-Ohms, 22 K-Ohms and 910 pico-Farads, respectively. The primed elements in the Q processing path are connected in the same manner as the corresponding elements in the I processing path.

The output of transmission gate 916 is coupled to the data (D) input of a data flip flop 930 via a cascade connection of two inverters 932 and 934. The first inverter of the cascade connection has a transmission gate 936 connected between its input and output terminals. Flip flop 930 is clocked and transmission gate 936 is controlled by signal HS which is inverted by means of another inverter 938 coupled to receive HS from terminal 904. The primed elements 930'–936' in the Q processing channel are similarly connected.

In operation, signal HS is normally low throughout a video line. Duirng this time the I and Q sampling signals are disabled by gate 910 and 914 thereby disabling the sampling gates 916 and 916'. Because of the inversion provided by inverter 938, transmission gates 936 and 936' are enabled thereby creating feedback paths for CMOS logic gate inverters 932 and 932' which are thereby self biased so as to pre-charge the integration capacitors 922 and 922' to half of the logic supply voltage.

When signal HS appears during the horizontal blanking interval, gates 936 and 936' are disabled thereby releasing the integration capacitors 922 and 922' from the pre-charge mode and enabling inverters 932 and 932' to act as sense amplifiers. Simultaneously, gates 910 and 914 are enabled thereby applying the I and Q sampling signals to sampling gates 916 and 916' which sample the AO signal. Depending on the signal phase (see FIG. 5e) capacitors 922 and 922' either charge above their pre-charge level or discharge below it depending on the value of the I data and the Q data. The voltage level on the integration capacitors is sensed by inverters 932 and 932' and applied to the data inputs of flip flops 930 and 930'. At the end of the HS pulse, flip flops 930 and 930' are clocked by the rising edge of the HS (inverted, as shown) and latch the I and Q data, respectively, for application to respective ones of the 5 bit shift registers 852 and 854 in IFTEC processor 802. Thereafter. transmission gates 916 and 916' are disabled (sampling ends) and transmission gates 936 and 936' are enabled thereby returning the integration capacitors 922 and 922' to their pre-charge condition until receipt of the next HS pulse.

What is claimed is:

1. A method for forming a video disc recording signal for facilitating intra-field track error correction upon subsequent playback of video disc records recorded with said disc recording signal comprising the steps of:
   (a) providing a video signal and a data sequence representative of field numbers of said video signal;
   (b) deriving a subset of said data sequence;
   (c) combining said video signal, said data sequence and said subset of said data sequence to form said recording signal with the subset data sequence conveying partial tracking information repeatedly within each field of said recording signal.

2. A video disc player for use with video disc records recorded with a signal manifestation including a video signal, a first data sequence representative of video field numbers and a second data sequence representative of a predetermined subset of said first data sequence, said second data sequence conveying partial tracking information repeatedly within each field of said video signal, said player comprising:
   (a) first means for recovering said first and second data sequences from said recorded signal manifestation;
   (b) second means for comparing said first and second data sequences to develop a tracking error indicating signal manifestation; and
   (c) third means responsive to said tracking error indicating signal manifestation for applying a tracking error correction signal to said first means in a sense to reduce tracking errors.

3. A method for forming a video disc recording signal comprising the steps of:
   (a) providing a video signal;
   (b) generating a first data sequence representative of field identification numbers;
   (c) generating a subset of said first data sequence to provide a second data sequence representative of partial field identification numbers;
   (d) processing said video signal, said first data sequence and said second data sequence to form said recording signal such that each field interval of said recording signal includes a complete field identification number in the vertical interval of said recording signal followed by a plurality of repetitions of the corresponding partial field identification number.

4. The method recited in claim 3 wherein said second data sequence excludes predetermined ones of the most and least significant bits of said first data sequence.

5. The method recited in claim 3 wherein said second data sequence includes at least two start bits, one of said start bits being of a predetermined constant logic level, the other of said start bits having a logic level which periodically alternates between first and second logic levels.

6. The method recited in claim 3 wherein said step of processing comprises:
   providing a first carrier wave;
   frequency modulating said first carrier wave with said video signal and said first data sequence during mutually exclusive time intervals;
   providing a second carrier wave;
   phase modulating said second carrier wave with said second data sequence; and
   combining the frequency modulated carrier wave and the phase modulated second carrier wave to form said recording signal.

7. The method recited in claim 6 wherein the step of phase modulating said second carrier wave comprises phase shift keying said second carrier wave with said second data sequence to encode at least two information bits on said second carrier wave for each keying interval thereof.

8. The method recited in claim 6 wherein the step of combining includes gating said phase modulated carrier wave and adding the gated phase modulated carrier wave to said frequency modulated carrier wave during a portion of the horizontal blanking interval of said video signal, said portion excluding the color burst time interval of said horizontal blanking interval.

9. The method recited in claim 8 further comprising the step of effectively limiting the bandwidth of said gated phase modulated carrier wave to a predetermined value.

10. The method recited in claim 9 wherein said predetermined value is on the order of about 0.5 MHz.

11. Playback apparatus for a video disc record of a type in which a video signal is recorded in a format wherein each field includes a first data sequence representative of a complete field number and a plurality of second data sequences, each second data sequence within a given field being a subset of the first data sequence of the given field and representing a partial field identification number, said apparatus comprising:
   first means including a pickup transducer for recovering said video signal and said data sequences from said disc record;
   second means responsive to said first data sequence for providing an expected track identification number and responsive to each said second data sequence for providing a track error indicating signal manifestation when the second data sequence differs from a predetermined subset of the first data sequence; and
   third means responsive to said track error indicating signal manifestation for effecting radial translation of said transducer by an amount and in a sense to correct tracking errors on an intra-field basis.

12. In a video disc player of the type including a tracking error correction system responsive to video field numbers recovered once each field from a video disc record for effecting radial translation of a signal recovery means in the player in a sense to reduce tracking errors when the recovered field number sequence is indicative of the presence of a tracking error, the improvement for providing intra-field track error correction, comprising:
   intra field track error correction processor means having a first input means coupled to said signal recovery means for receiving a signal manifestation representative of a subset of said video field numbers and which repeats on a periodic basis within a field, having a second input means coupled to said tracking error correction system for receiving a corresponding subset of said video field numbers which is constant within a field and having output means for supplying a tracking error signal indicating manifestation to an input means of said tracking error correction system for correcting tracking errors when said subsets differ by a predetermined amount.

13. A video disc player as recited in claim 12 wherein said predetermined amount is an integer other than zero.

14. A video disc player as recited in claim 12 wherein said processor means comprises:
- detector means coupled to said input means and having at least one output means for providing a first plurality of data bits represenative of said subset of said video field numbers;
- first register means responsive to said data bits for providing a parity check signal and a data framing signal;
- second register means for storing the data bits of said first register means in response to valid indicators of parity and framing of said parity and framing signals; and
- subtractor means coupled to said second input means and to said second register means for developing said tracking error signal manifestation and coupled to supply the same to said input means of said tracking error correction system.

15. In combination:
- a video disc player having a microprocessor means responsive to video field numbers recovered once each field while playing a disc for radially translating a signal recovery means of said player in a sense to correct tracking errors upon detection of an abnormal sequence of said video field numbers; and
- processor means coupled to said signal recovery means for receiving a quadrature phase shift keyed signal representative of a subset of said field numbers excluding selected most significant bits and selected least significant bits of said field numbers, said processor means being also coupled to said microprocessor means for receiving field number data therefrom and for supplying data thereto representative of differences between said subset of said field numbers and said field number data.

* * * * *